United States Patent
Lee

(10) Patent No.: US 8,466,884 B2
(45) Date of Patent: Jun. 18, 2013

(54) TOUCH ELECTROPHORETIC DISPLAY APPARATUS

(75) Inventor: Cheng-Hao Lee, Hsinchu (TW)

(73) Assignee: E Ink Holdings Inc., Hsinchu County (TW)

( * ) Notice: Subject to any disclaimer, the term of this patent is extended or adjusted under 35 U.S.C. 154(b) by 373 days.

(21) Appl. No.: 12/472,354

(22) Filed: May 26, 2009

(65) Prior Publication Data
US 2010/0265192 A1 Oct. 21, 2010

(30) Foreign Application Priority Data
Apr. 17, 2009 (TW) ................................ 98112890 A

(51) Int. Cl.
*G06F 3/041* (2006.01)
(52) U.S. Cl.
USPC ............... 345/173; 178/18.01; 178/19.01; 345/107
(58) Field of Classification Search
USPC ............ 178/18.01–19.07; 345/107, 173–178
See application file for complete search history.

(56) References Cited

U.S. PATENT DOCUMENTS

| | | | |
|---|---|---|---|
| 6,473,072 B1 | 10/2002 | Comiskey et al. | |
| 2002/0190964 A1* | 12/2002 | Van Berkel | 345/173 |
| 2004/0027327 A1* | 2/2004 | LeCain et al. | 345/107 |
| 2007/0165009 A1* | 7/2007 | Sakurai et al. | 345/177 |
| 2008/0297496 A1 | 12/2008 | Watson et al. | |

FOREIGN PATENT DOCUMENTS

| | | |
|---|---|---|
| CN | 1446370 A | 10/2003 |
| CN | 101382718 | 3/2009 |
| TW | 556141 | 10/2003 |
| TW | I285903 | 8/2007 |
| TW | I288699 B | 10/2007 |
| TW | 200807453 | 2/2008 |

OTHER PUBLICATIONS

Taiwan Official Action issued on Sep. 14, 2012.
Taiwan Official Action issued on Nov. 28, 2012.
China Official Action issued on Dec. 13, 2012.

* cited by examiner

*Primary Examiner* — Michael Pervan
(74) *Attorney, Agent, or Firm* — Chun-Ming Shih

(57) ABSTRACT

A touch electrophoretic display apparatus includes an electrophoretic display panel and a touch panel. The electrophoretic display panel includes a substrate and a front plane laminate, wherein the front plane laminate is disposed on the substrate and the front plane laminate has an electrophoretic layer. The touch panel is disposed on the front plane laminate and is contacted the front plane laminate. The touch electrophoretic display apparatus has an advantage of high brightness.

7 Claims, 4 Drawing Sheets

TOUCH ELECTROPHORETIC DISPLAY APPARATUS

CROSS-REFERENCE TO RELATED APPLICATIONS

This application is based upon and claims the benefit of priority from the prior Taiwanese Patent Application No. 098112890, filed Apr. 17, 2009, the entire contents of which are incorporated herein by reference.

BACKGROUND

1. Field of the Invention

The present invention relates to an electrophoretic display apparatus, and particularly to a touch electrophoretic display apparatus.

2. Description of the Related Art

With the advancement of the flat display technology and the flat display apparatuses having advantages of light in weight, small in size and low power consuming, the flat display apparatuses have become more and more popular. In general, the flat display apparatuses include liquid crystal display (LCD) apparatuses, plasma display panel (PDP) apparatuses, organic light emitting diode (OLED) display apparatuses and electrophoretic display apparatuses, etc., wherein the electrophoretic display apparatus does not include light emitting source, so the electrophoretic display apparatus further has the advantage of power saving in comparison with other flat display apparatuses. Therefore, the electrophoretic display apparatus is widely applied to electronic paper products or other portable electronic products.

Moreover, to promote convenience of operating, more and more portable electronic products are respectively equipped with a touch display apparatus. Therefore, the conventional technique provides a touch electrophoretic display apparatus having a touch panel.

FIG. 1 is a schematic view of a conventional touch electrophoretic display apparatus. Referring to FIG. 1, the conventional touch electrophoretic display apparatus 100 includes a touch panel 110 and an electrophoretic display panel 200. The electrophoretic display panel 200 includes a substrate 210, a front plane laminate 220 and a protection sheet 230. The front plane laminate 220 is disposed on the substrate 210, and the protection sheet 230 is disposed on the front plane laminate 220. Furthermore, the front plane laminate 220 has an electrophoretic layer 222, and the substrate 210 has a drive circuitry layer 212 for driving the electrophoretic layer 222. Moreover, the protection sheet 230 is composed of a bottom protection film 231, a vapor-resistant film 233, an electron paper film 235, an anti-glare film 237 and a top protection film 239.

Due to the touch electrophoretic display apparatus 100 having no light emitting source, transmittance of the touch electrophoretic display apparatus 100 is highly related to brightness of the touch electrophoretic display apparatus 100. In the conventional touch electrophoretic display apparatus 100, the touch panel 110 disposed on the protection sheet 230 has protection functions for the electrophoretic display panel 200, and the protection functions of the touch panel 110 may include a part functions or all functions of the protection sheet 230. In other words, the conventional touch electrophoretic display apparatus 100 has some films which are not needed, so the transmittance of the touch electrophoretic display apparatus 100 is reduced and the brightness of the conventional touch electrophoretic display apparatus 100 is consequently reduced.

BRIEF SUMMARY

The present invention provides a touch electrophoretic display apparatus having higher brightness.

To achieve the above-mentioned advantages, the present invention provides a touch electrophoretic display apparatus including an electrophoretic display panel and a touch panel. The electrophoretic display panel includes a substrate and a front plane laminate, wherein the front plane laminate is disposed on the substrate and the front plane laminate has an electrophoretic layer. The touch panel is disposed on the front plane laminate and is contacted the front plane laminate.

In an embodiment of the present invention, the touch panel has a protection layer and the protection layer is selected from a group consisted of combinations of an anti-glare film, a vapor-resistant film and a protection film.

In an embodiment of the present invention, the substrate is a rigid substrate or a flexible substrate.

In an embodiment of the present invention, the electrophoretic display panel is a microcup electrophoretic layer or a microcapsule electrophoretic layer.

In an embodiment of the present invention, the touch panel is a capacitive touch panel, a resistance touch panel or an optical touch panel.

To achieve the above-mentioned advantages, the present invention further provides a touch electrophoretic display apparatus including an electrophoretic display panel and a touch panel. The electrophoretic display panel includes a substrate, a front plane laminate and a protection sheet. The front plane laminate is disposed on the substrate and the front plane laminate has an electrophoretic layer. The protection sheet is disposed on the front plane laminate and the protection sheet is selected from a group consisted of combinations of a vapor-resistant film and a protection film. Further, the touch panel is disposed on the protection sheet.

In an embodiment of the present invention, the touch panel has an anti-glare film.

In an embodiment of the present invention, the substrate is a rigid substrate or a flexible substrate.

In an embodiment of the present invention, the electrophoretic display panel is a microcup electrophoretic layer or a microcapsule electrophoretic layer.

In an embodiment of the present invention, the touch panel is a capacitive touch panel, a resistance touch panel or an optical touch panel.

In the touch electrophoretic display apparatus of the present invention, the touch panel can provide protection functions for the electrophoretic display panel, so some films of the protection sheet can be omitted and even the entire protection sheet can be omitted. Such that, transmittance of the touch electrophoretic display apparatus of the present invention can be increased and brightness of the touch electrophoretic display apparatus of the present invention is consequently promoted.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
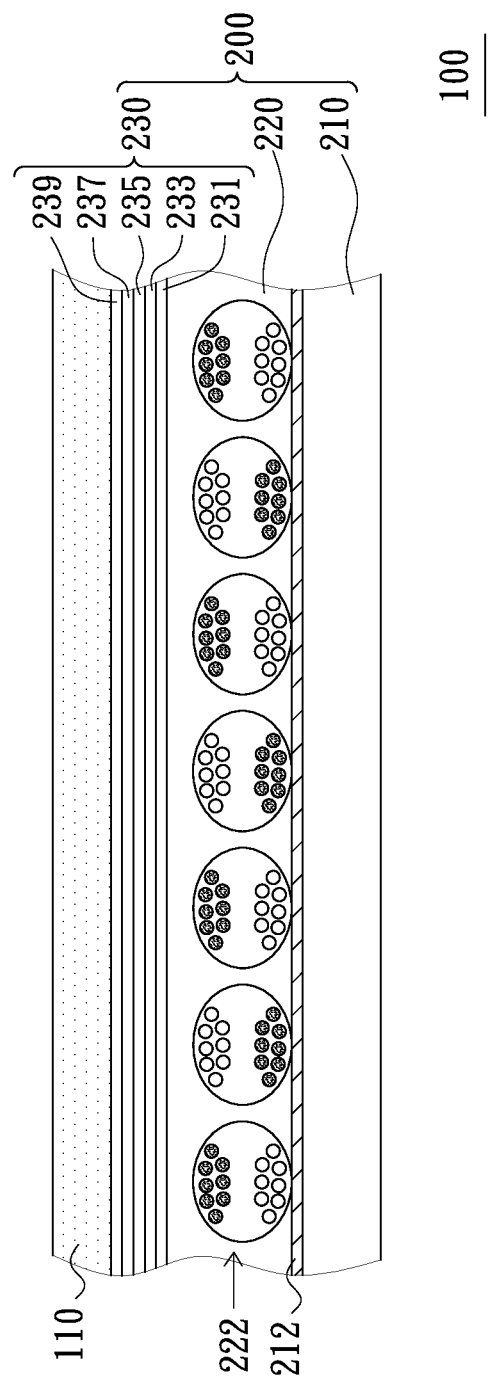
FIG. 1 is a schematic view of a conventional touch electrophoretic display apparatus.
Figure 2:
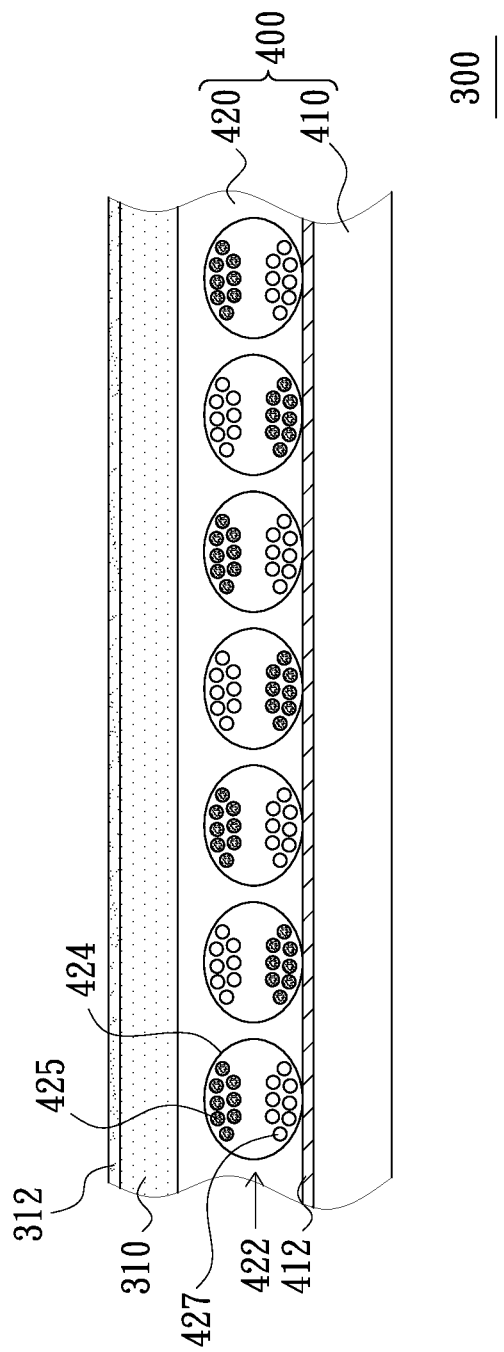
FIG. 2 is a schematic view of a touch electrophoretic display apparatus according to an embodiment of the present invention.

FIG. 2 is a schematic view of a touch electrophoretic display apparatus according to an embodiment of the present invention. Referring to FIG. 2, the touch electrophoretic display apparatus 300 of the present embodiment includes a touch panel 310 and an electrophoretic display panel 400. The electrophoretic display panel 400 includes a substrate 410 and a front plane laminate 420, wherein the front plane laminate 420 is disposed on the substrate 410 and the front plane laminate 420 has an electrophoretic layer 422. The touch panel 310 is disposed on the front plane laminate 420 and is contacted the front plane laminate 420.

The substrate 410 can be a rigid substrate or a flexible substrate, wherein the rigid substrate can be, but not limited to, a glass substrate and the flexible substrate can be, but not limited to, a plastic substrate. The substrate 410 has a drive circuitry layer 412 and the drive circuitry layer 412 can include a plurality of thin film transistors and a plurality of pixel electrodes. Moreover, the electrophoretic layer 422 of the front plane laminate 420 can include a plurality of microcapsules 424, and that means the electrophoretic layer 422 is a microcapsule electrophoretic layer. Each of the microcapsules 424 has a plurality of first charged particles 425 and a plurality of second charged particles 427, wherein the first charged particles 425 and the second charged particles 427 have different colors and different electrical properties. In other words, the first charged particles 425 and the second charged particles 427 may be positive particles and negative particles respectively. Moreover, the front plane laminate 420 further includes a common electrode layer (not shown) located above the electrophoretic layer 422. The changing of the electric field between the common electrode layer and the drive circuitry layer 412 can drive the first charged particles 425 and the second charged particles 427 to move, and thus the electrophoretic display panel 400 can display different images. One skilled in the art can know the driving method of the electrophoretic display panel, and the detail description of the driving method is omitted here.

The touch panel 310 can be a capacitive touch panel, a resistance touch panel, an optical touch panel or other type touch panel. The touch panel 310 can sense user operation to enable the touch electrophoretic display apparatus 300 to display the corresponding image according to the user operation. Moreover, the touch panel 310 can has a protection layer 312, and the protection layer 312 is selected from a group consisted of combinations of an anti-glare film, a vapor-resistant film and a protection film. That means, the protection layer 312 can be composed of at least one of the anti-glare film, the vapor-resistant film and the protection film, and number of the anti-glare film, number of the vapor-resistant film and number of the protection film can be multiple.

In comparison with the conventional technique, due to the present embodiment using the touch panel 310 contacted the front plane laminate 420 to protect the electrophoretic display panel 400, the protection sheet used in the conventional technique is not needed. Such that, the transmittance of the touch electrophoretic display apparatus 300 is increased and the brightness of the touch electrophoretic display apparatus 300 is consequently promoted. Moreover, in the touch electrophoretic display apparatus 300, the protection sheet is omitted, so the cost of the touch electrophoretic display apparatus 300 is reduced.

Figure 3:
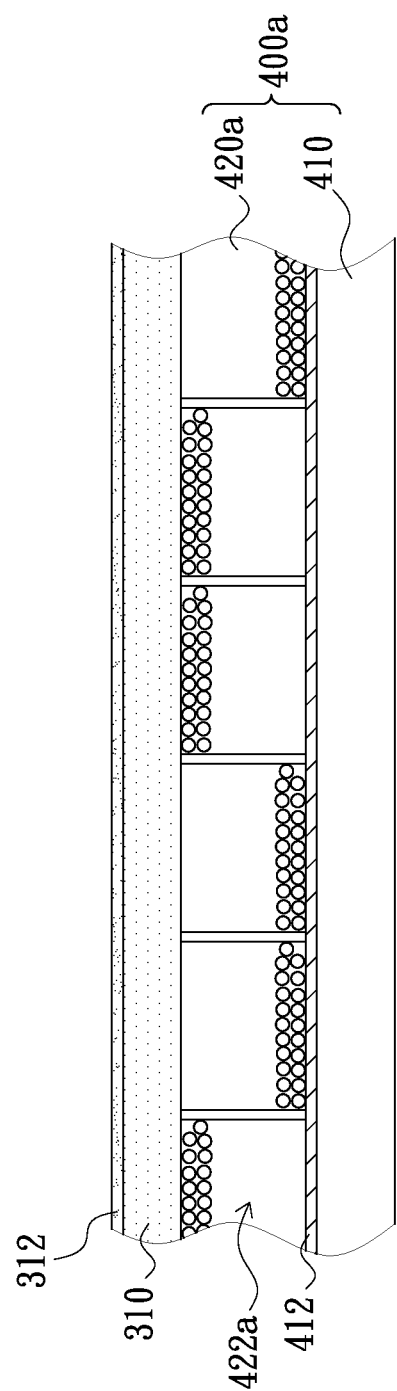
FIG. 3 is a schematic view of a touch electrophoretic display apparatus according to another embodiment of the present invention.

It should be noted that the protection layer 312 is not a necessary element of the touch panel 310. Moreover, the protection layer 312 can be disposed at any proper position in the touch panel 310, and the films of the protection layer 312 can be separated in the touch panel 310. Furthermore, although the electrophoretic layer 422 is the microcapsule electrophoretic layer, the electrophoretic layer 422 can be replaced by a microcup electrophoretic layer such as an electrophoretic layer 422a of a front plane laminate 420a of an electrophoretic display panel 400a shown in FIG. 3.

Figure 4:
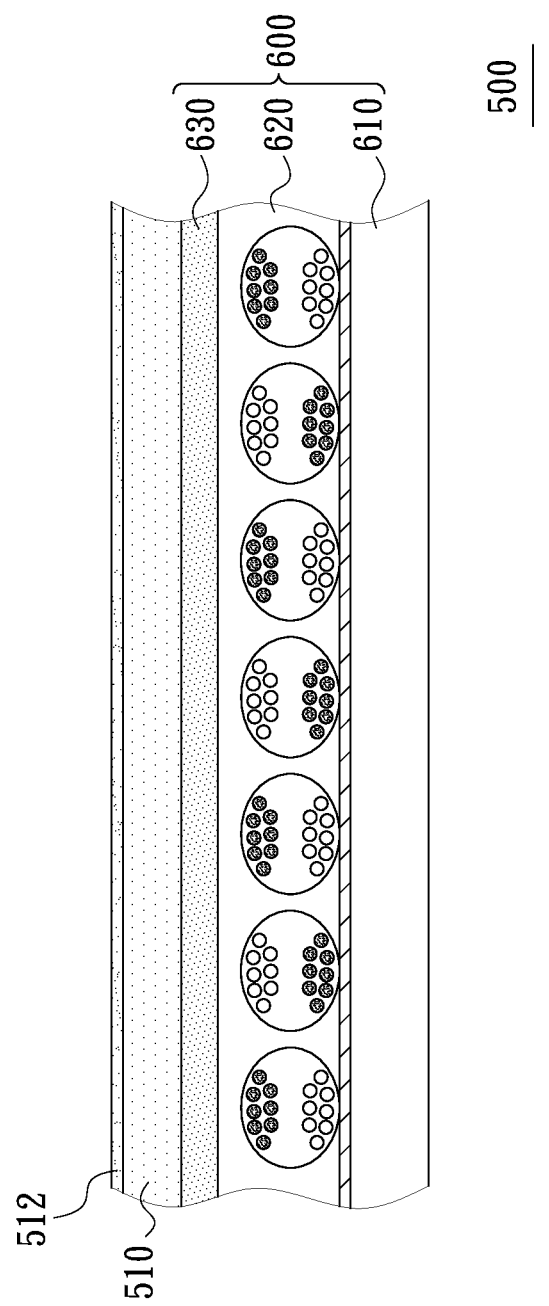
FIG. 4 is a schematic view of a touch electrophoretic display apparatus according to another embodiment of the present invention.

FIG. 4 is a schematic view of a touch electrophoretic display apparatus according to another embodiment of the present invention. Referring to FIG. 4, the touch electrophoretic display apparatus 500 of the present embodiment includes a touch panel 510 and an electrophoretic display panel 600. The electrophoretic display panel 600 includes a substrate 610, a front plane laminate 620 and a protection sheet 630. The front plane laminate 620 is disposed on the substrate 610. The protection sheet 630 is disposed on the front plane laminate 620 and the touch panel 510 is disposed on the protection sheet 630. Moreover, the protection sheet 630 is selected from a group consisted of combinations of a vapor-resistant film and a protection film. That means, the protection sheet 630 can be composed of at least one of the vapor-resistant film and the protection film, and number of the vapor-resistant film and number of the protection film can be multiple.

The substrate 610 and the front plane laminate 620 of the present embodiment are similar to the substrate 410 and the front plane laminate 420 of FIG. 2, so detail description of the substrate 610 and the front plane laminate 620 is omitted. It should be noted, the electrophoretic layer of the front plane laminate 620 can be replaced by the microcup electrophoretic layer 422a shown in FIG. 3. Further, the touch panel 510 can be a capacitive touch panel, a resistance touch panel, an optical touch panel or other type touch panel. The touch panel 510 can has an anti-glare film 512, and the anti-glare film 512 can be disposed at any proper position in the touch panel 510. Moreover, the touch panel 510 can have other films which can provide protection functions, and the protection functions provided by the films of the touch panel 510 are, in principle, different to the protection functions provided by the films of the protection sheet 630.

In comparison with the conventional technique, due to the protection sheet 630 of the present embodiment having fewer films, the transmittance of the touch electrophoretic display apparatus 500 can be increased. Therefore, the touch electrophoretic display apparatus 500 of the present embodiment has higher brightness.

In summary, in the touch electrophoretic display apparatus of the present invention, the touch panel can provide protection functions for the electrophoretic display panel, so some films of the protection sheet can be omitted and even the entire protection sheet can be omitted. Such that, the cost of the touch electrophoretic display apparatus of the present invention can be reduced, and the transmittance of the touch electrophoretic display apparatus of the present invention can be increased to promote the brightness of the touch electrophoretic display apparatus of the present invention.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A touch electrophoretic display apparatus comprising:
   a flexible substrate;
   a front plane laminate disposed on the flexible substrate, and the front plane laminate having an electrophoretic layer; and
   a touch panel directly disposed on the front plane laminate so the touch panel is contacted with the front plane laminate;
   wherein the touch panel has a protection layer and the protection layer is consisted of an anti-glare film, a vapor-resistant film and a protection film.

2. The touch electrophoretic display apparatus as claimed in claim 1, wherein the electrophoretic layer is a microcup electrophoretic layer or a microcapsule electrophoretic layer.

3. The touch electrophoretic display apparatus as claimed in claim 1, wherein the touch panel is a capacitive touch panel, a resistance touch panel or an optical touch panel.

4. A touch electrophoretic display apparatus comprising:
   a substrate;
   a front plane laminate disposed on the substrate, and the front plane laminate having an electrophoretic layer;
   a protection sheet directly disposed on the front plane laminate and the protection sheet being consisted of a vapor-resistant film and a protection film; and
   a touch panel disposed on the protection sheet.

5. The touch electrophoretic display apparatus as claimed in claim 4, wherein the substrate is a rigid substrate or a flexible substrate.

6. The touch electrophoretic display apparatus as claimed in claim 4, wherein the electrophoretic display panel is a microcup electrophoretic layer or a microcapsule electrophoretic layer.

7. The touch electrophoretic display apparatus as claimed in claim 4, wherein the touch panel is a capacitive touch panel, a resistance touch panel or an optical touch panel.

* * * * *